Figure 1:
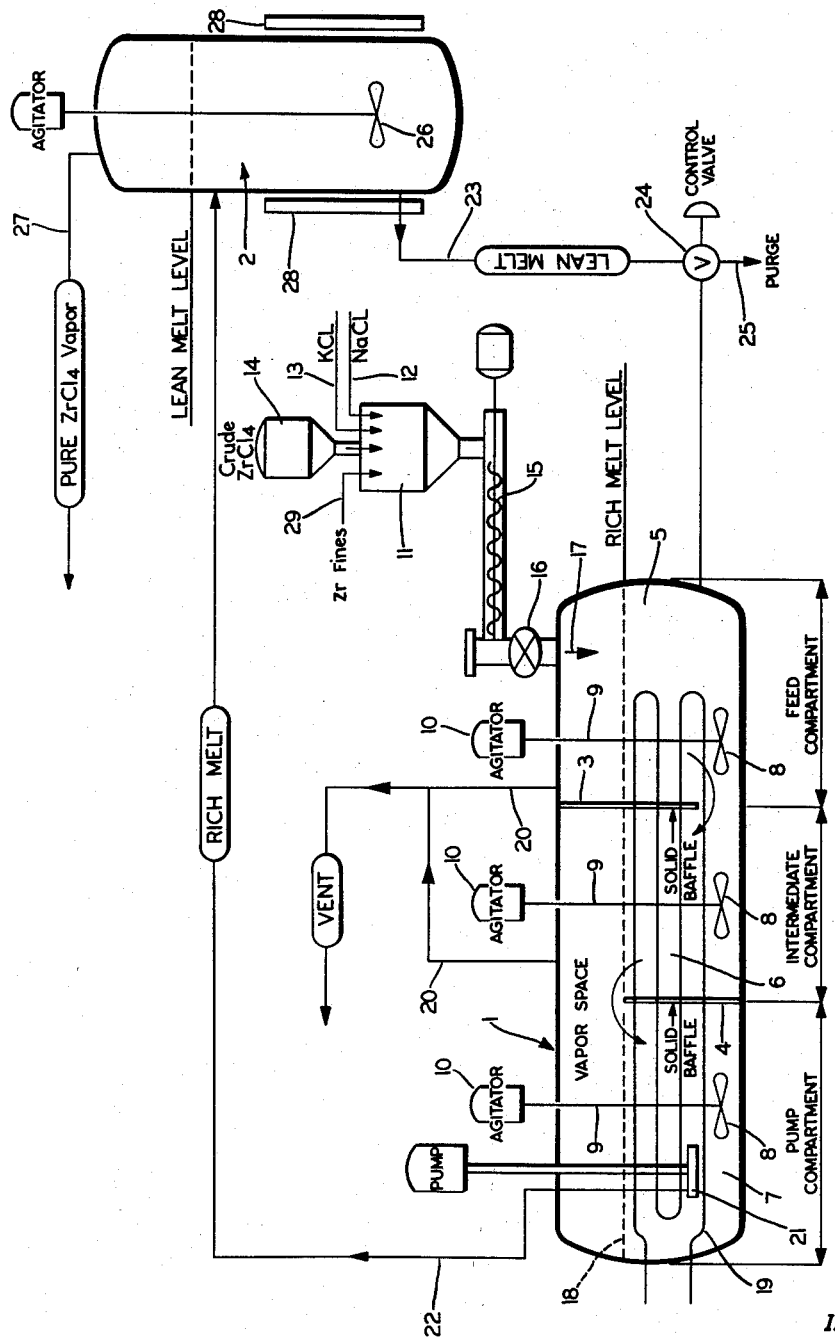

Dec. 17, 1963  D. K. ROSS  3,114,611
APPARATUS FOR REFINING METAL CHLORIDES IN MOLTEN SALTS
Filed June 4, 1959

INVENTOR.
*David K. Ross*
BY
*Frease, Bishop, Johns & Schick*
ATTORNEYS

United States Patent Office 3,114,611
Patented Dec. 17, 1963

3,114,611
APPARATUS FOR REFINING METAL CHLORIDES IN MOLTEN SALTS
David K. Ross, Madison, Ohio, assignor, by mesne assignments, to National Distillers and Chemical Corporation, a corporation of Virginia
Filed June 4, 1959, Ser. No. 818,024
1 Claim. (Cl. 23—264)

The invention relates to the refining of metal chlorides, and more particularly to novel apparatus and method for producing refined zirconium tetrachloride from crude zirconium tetrachloride in a molten salt bath.

The improved apparatus and method comprising the invention is applicable to refining chlorides of metals of group IVa of the periodic table and particularly to a process for production of zirconium metal sponge. Zirconium tetrachloride, received from a carbothermic type chlorination process, is refined by the apparatus and method to which the invention pertains and is then reduced, leached and dried to produce zirconium metal sponge.

The zirconium tetrachloride as received from a carbothermic type chlorination process is a solid in powder form and contains impurities as by-products of the chlorination reaction such as phosgene, chlorine and carbon monoxide.

Under present practice, this crude $ZrCl_4$ is refined by adding it to a single compartment melter vessel containing a molten salt bath rich in $ZrCl_4$ agitated to dissolve the $ZrCl_4$ and keep the vessel contents in suspension. The rich melt is pumped into a vaporizer vessel where the temperature is increased to drive off refined $ZrCl_4$ vapor which is used to prepare reactor grade zirconium.

The rich melt in the vaporizer vessel then becomes a lean melt, with respect to $ZrCl_4$, because of the loss of $ZrCl_4$ vapor, and this lean melt is returned to the melter vessel where it is again enriched by the addition of crude $ZrCl_4$ and the operation is repeated.

Many difficulties have been experienced with this standard process. For instance, the purified $ZrCl_4$ was contaminated by entrained gases derived from the crude $ZrCl_4$, such as phosgene, chlorine and carbon monoxide which are by-products of the carbothermic type chlorination reaction. These entrained gases, present in the melt, were pumped from the single compartment melter to the vaporizer where contamination occurred.

Partial hydrolysis of the crude $ZrCl_4$ results in the formation of zirconium oxychloride, which in turn forms a sludge in the system and increases the melt viscosity to the point where it becomes extremely resistant to flow.

Introduction of the crude $ZrCl_4$ feed into the melt in the single compartment melter vessel, wherein the pump to the vaporizer is located in the same chamber as the crude $ZrCl_4$ feed point, results in entrainment of undissolved $ZrCl_4$ in material pumped to the vaporizer. This undissolved $ZrCl_4$ exerts its own independent high vapor pressure and results in great difficulty in controlling the vaporization rate in the vaporizer.

Also, severe corrosion of equipment occurs due at least in part to the presence of the contaminating gases mentioned above, and to the presence of certain polyvalent metal ions which also are contaminants in the crude $ZrCl_4$ feed.

Zirconium fines have been used as an addition agent in the melter, to react with the contaminating gases originating from chlorination and to reduce the polyvalent metal ions to a lower valence state. While this procedure has reduced corrosion satisfactorily, it has required the use of an excessive and uneconomical amount of zirconium fines due to the slow rate of the reaction. It has not been possible to increase the reaction time economically in a single compartment melter vessel where the pump and crude $ZrCl_4$ feed point communicate.

A general object of the present invention is to provide an apparatus and method for refining crude metal chlorides which overcomes the above mentioned difficulties.

Another object is to provide a multi-chamber melter vessel for the molten salt bath, including a feed chamber to which the crude metal chlorides are fed, and a pump chamber from which the rich melt is pumped to a vaporizer, the feed and pump chambers being separated from each other preferably by one or more intermediate chambers.

A further object of the invention is to provide baffles or the like to separate the feed and pump chambers of the melter vessel and prevent by-passing of the contaminating gases and solid undissolved crude metallic chlorides, and to cause the particles of crude metallic chlorides to travel a devious path through the several chambers before reaching the pump chamber.

Moreover, it is an object of the present invention to provide a means and procedure for preventing the entrainment of undesirable gases in the rich melt pumped from the melter vessel to the vaporizer vessel, by venting these gases from the several chambers of the improved melter vessel, and by agitating the melt in each chamber for proper release of such gases.

A still further object of the invention is to provide for agitating the molten bath in each of the several chambers of the improved melter vessel not only for release of entrained gases but to assist in decomposition of hydrolysis products.

Moreover, it is an object of the present invention to utilize the separated agitated melt chambers of the improved melter vessel as a means of preventing by-passing of entrained crude $ZrCl_4$ particles to the vaporizer vessel.

Also it is an object of the present invention to economically use zirconium fines or other reducing materials for combatting corrosion in the system by the provision of separated agitated chambers so that adequate residence time is provided for any necessary time-dependent reaction, such as between zirconium fines and the melt constituents.

Finally, it is an object of the present invention generally to improve the apparatus and procedures which may be used for refining crude metal chlorides to eliminate existing difficulties in the art, solve existing problems in the art, and attain the foregoing objectives and desiderata with a construction and system which may be manufactured, operated and controlled in a simple and convenient manner.

The above and other objects, apparent from the drawings and following description, may be attained, the above described difficulties overcome, and the advantageous results obtained, by the methods, steps, procedures, apparatus, constructions, arrangements, combinations, subcombinations and parts, which comprise the present invention, a preferred embodiment of which, illustrative of the best mode in which applicant has contemplated applying the principle, being set forth in detail in the following description and illustrated in the accompanying drawings.

The invention may be briefly stated in general terms as comprising a multi-chamber melter vessel containing a molten bath of sodium chloride and/or potassium chloride, rich in $ZrCl_4$ or other metal chlorides of group IVa metals to be refined.

The melter vessel is divided by baffles or the like into a feed chamber, into which crude metal chloride is fed, and a pump chamber from which the melt is pumped to the vaporizer, the feed chamber and pump chamber being separated by at least one intermediate chamber.

Agitators are provided in each chamber of the melter vessel for continuously agitating the molten bath. The baffles, or other means which separate the chambers of the melter vessel, prevent by-passing of the contaminating gases and solid undissolved crude metal chlorides, and cause the particles of crude metal chlorides to travel a devious path through the several agitating chambers while dissolving in the molten bath before reaching the pump in the pumping chamber. Means is provided for venting the several chambers of the melt vessel so as to remove undesirable contaminating gases therefrom.

The rich melt which is pumped from the pump chamber to the vaporizer furnace is heated in the latter to higher temperature to drive off the refined $ZrCl_4$, or other group IVa metal chloride, as a vapor which is used in the preparation of zirconium sponge metal or the like.

The rich melt in the vaporizer furnace thus becomes a lean melt, with respect to the volatile metal chloride, because of the loss of metal chloride vapor, and this lean melt is returned to the feed chamber of the melter vessel and the operation is repeated.

A preferred embodiment of the invention is illustrated in the accompanying drawings, in which the figure is a diagrammatic view of the improved apparatus.

The apparatus for refining metal chlorides comprises a multi-chamber melter vessel indicated generally at 1 and a vaporizer furnace indicated generally at 2. The melter vessel is divided into a plurality of chambers as by baffles 3 and 4 or similar means.

The baffle 3 is shown as extending from the top wall of the melter vessel 1 to a point spaced from the bottom wall thereof and the baffle 4 extends upward from the bottom wall of the melter vessel 1 to a point spaced from the top wall thereof.

While only two baffles are shown, it should be understood that additional baffles may be provided, the purpose of the baffles being to separate the interior of the melter vessel into a feed chamber 5, one or more intermediate chambers 6 and a pump chamber 7, separated from the feed chamber 5 by the intermediate chamber or chambers.

A rotatable agitator 8 is located in the lower portion of each of the chambers 5, 6 and 7. The shafts 9 of these agitators 8 are operatively connected to motors 10 or other suitable driving means for continuously rotating the agitators.

A molten salt bath of a group IVa metal tetrachloride with sodium chloride and/or potassium chloride is contained in the melter vessel 1. This molten salt bath is rich in the metal chloride to be refined. As the apparatus and method to which the invention pertains are particularly adapted to the refining of zirconium tetrachloride in the making of zirconium sponge, the invention is described herein as applied to the refining of zirconium tetrachloride.

Sodium chloride and/or potassium chloride may be charged into the feed hopper 11 for the melter vessel in measured amounts as required, and as indicated generally at 12 and 13. Crude $ZrCl_4$ from the chlorination process and contained in sealed tote bins 14 to prevent atmospheric contamination also may be charged to the feed hopper 11.

Feed materials charged into the feed hopper 11 are conveyed by a preferably screw conveyor 15 to a rotary feeder 16 which discharges at 17 into feed chamber 5 of the melter vessel 1, at the desired rate of feed. The level at which the molten salt bath rich in crude $ZrCl_4$ is maintained, is indicated at 18.

Mixtures of $ZrCl_4$ and sodium chloride and/or potassium chloride, are obtainable which melt as low as 200–250° C. (392–482° F.). The melter vessel is preferably operated at a temperature of about 615° F. by heating the vessel and its several chambers by any suitable and novel heating means, such as by glow-bar electric heating elements 19 located along the outside of the vessel walls below the bath level, and controlled by usual controls.

The several chambers of the melter vessel are vented as indicated at 20 for carrying off the undesirable phosgene, chlorine and carbon monoxide gases. These vented gases may be delivered to a condenser and then to a sublimer scrubbing tower, neither of which is shown in the drawings as they form no part of the invention.

A pump 21 is located below the level 18 of the molten salt bath in the pump chamber 7 for preferably continuously pumping the rich melt from the pump chamber 7 through the line 22 to the upper portion of the melt contained in the vaporizer furnace 2. A return line 23 leads from the lower portion of the vaporizer furnace 2 to the feed chamber 5 of the melter vessel 1, controlled by valve 24. Valve 24 may have a separate purge line 25 connected thereto for purging the system from time to time when desired.

An agitator 26 is located in the vaporizer furnace 2 below the melt level therein for continuously agitating the molten salt bath in vaporizer furnace 2 to which a stream of rich melt is continually delivered from the pump chamber 7 of the melter vessel 1.

Vaporized pure $ZrCl_4$ flows from the upper end of the vaporizer chamber through the pipe line 27 to a sublimer condenser, which is not shown as it forms no part of the present invention. The vaporizer furnace preferably is operated in a temperature range of from 700° F. to 800° F., the melt being heated by any suitable means such as glow-bar electric heating elements 28 located along the outside of the vaporizer walls below the bath level, and controlled by usual controls.

In the operation of the apparatus, crude $ZrCl_4$ is continuously fed to the molten salt bath in the feed chamber 5 of the melter vessel 1 at a sufficient rate to maintain the $ZrCl_4$ content of the salt bath substantially constant and rich in $ZrCl_4$.

The particles of crude $ZrCl_4$ fed to chamber 5 in dissolving travel a devious path in the molten salt bath, through the several chambers 5, 6 and 7 of the melter vessel from the feed chamber to the pump chamber. The molten bath is continuously agitated in each chamber to assist in release of the undesirable phosgene, chlorine and carbon monoxide gases which escape through the vents 20.

A rich melt with respect to $ZrCl_4$ is continuously pumped from the pump chamber 7 through the line 22 to the vaporizer furnace 2 where the temperature is increased to drive off refined $ZrCl_4$ vapor through the line 27 for use in the preparation of reactor-grade zirconium.

As the refind $ZrCl_4$ vapors are thus driven off, the rich melt in the vaporizer furnace 2 becomes a lean melt, with respect to $ZrCl_4$ and this lean melt is returned through the line 23 to the feed chamber 5 of the melter vessel 1 where the addition of crude $ZrCl_4$ enriches the lean melt and the operation is repeated.

The rate of flow of the lean melt from the vaporizer furnace 2 to the feed chamber 5 of the melter vessel 1 may be controlled by control valve 24.

Zirconium fines also may be introduced into the feed chamber 5 to react with the contaminating gases and to reduce the polyvalent metal ions to a lower valence state. The feed rate of zirconium fines is held in the range of 1 to 10 pounds per thousand pounds of zirconium tetrachloride fed to the feed chamber. The zirconium fines added may be charged at the proper rate, from time to time, into feed hopper 11 as indicated at 29.

It has been found that melt viscosity is adversely affected by such impurities as zirconium subhalides, zirconyl chloride, ferrous chloride, zirconium oxide and carbon insolubles received from the chlorination process. These impurities are maintained at the desired low concentration to maintain proper melt fluidity, by suitable purging of the melt from the system from time to time. The preferred location for purging is from the lean melt at the purge line 25.

To avoid an excessive increase in melt viscosity and at the same time obtain a satisfactory product, the zirconium fines level must be maintained to hold a negative condenser offgas analysis for oxygenated carbon compounds. When this is done good quality zirconium tetrachloride product of reactor grade is obtained.

The vaporization rate and melt circulation rate should be adjusted to maintain a moderate heat flux on the vaporizer wall and at the same time not add excessive heat through the return line 23 to adversely affect the operating temperature level of the melter 1.

Although the invention has been described in detail with reference to the refining of crude $ZrCl_4$, it is understood that it is applicable generally to refining chlorides of metals of group IVa of the periodic table comprising zirconium, titanium and hafnium.

Furthermore, although the invention has particular application to the refining of crude $ZrCl_4$ produced in a carbothermic type chlorinator which contains contaminating gases, it is also applicable to the refining of crude $ZrCl_4$ produced by other chlorination procedures and which may not contain contaminating gases as impurities.

Accordingly, the present invention provides new apparatus and methods for refining metal chlorides in molten salts, which eliminates operating difficulties heretofore encountered in the use of present single compartment melter vessels for refining $ZrCl_4$ produced in a carbothermic type chlorinator; which provides for agitating a crude $ZrCl_4$-containing salt bath melt in all of the several chambers of a multi-chamber melter vessel to thereby release contaminating gases in the crude $ZrCl_4$ into spaces above the melt level in each of the several chambers, and for then venting such released gases from such spaces in the several chambers to prevent entrainment of such gases in the rich melt pumped from the melter to a vaporizer vessel; which provides for utilizing the agitation of the melt in the several chambers of the multi-chamber melter vessel to assist in the decomposition of hydrolysis products; which provides for introducing the crude $ZrCl_4$ feed to the system into an agitated feed chamber of a multi-chamber melter vessel separate from the agitated chamber from which the melt is pumped to the vaporizer furnace so that the agitation in the several chambers and the devious path which must be traveled by the crude $ZrCl_4$ feed particles establishes suitable conditions and gives sufficient time for dissolution of the crude $ZrCl_4$ in the melt without entrainment of undissolved crude $ZrCl_4$ particles in th melt delivered to the vaporizer furnace; which provides for the use of zirconium fines to combat corrosion with sufficient residence time for the fines in the melter vessel to permit the desired reactions to occur assisted by the agitation in the separate chambers and the devious path of travel of the zirconium fines feed from the feed chamber to the pump chamber; which generally improves the art of refining chlorides of metals of group IVa; and which overcomes the difficulties and solves existing problems in the art.

In the foregoing description, certain terms have been used for brevity, clearness and understanding, but no unnecessary limitations are to be implied therefrom beyond the requirements of the prior art; because such words are used for descriptive purposes herein and not for the purpose of limitation and are intended to be broadly construed.

Moreover, the invention is not limited to the exact shape and size of the structure illustrated diagrammatically because the particular arrangement may be varied to provide other structural modifications without departing from the scope of the present invention.

Having now described the features, discoveries and principles of the invention, the construction, operation and use of the improved apparatus and method for refining metal chlorides in molten salts, and the advantageous, new and useful results obtained thereby; the new and useful methods, steps, procedures, apparatus, constructions, arrangements, combinations, sub-combinations, parts and elements, and mechanical equivalents obvious to those skilled in the art, are set forth in the appended claim.

I claim:

An apparatus for refining a volatile metal chloride in a molten salt bath, comprising a horizontal melter vessel; a longitudinal series of baffle elements disposed laterally of said vessel and substantially dividing said vessel into a longitudinal series of chambers including a feed chamber at one end, a discharge chamber at the other end, and at least one intermediate chamber; wherein said feed and intermediate chambers are in communication only under a first baffle element, and said intermediate and discharge chambers are in communication only over the remaining baffle elements in said vessel; said baffle elements being so positioned that a liquid seal is formed when molten materials are present in the melter vessel; a vaporizer vessel; first conduit means connecting said vaporizer vessel with said feed chamber; second conduit means connecting said discharge chamber with said vaporizer vessel, said means including a pump; means for introducing solid materials into said feed chamber, including the constituents of said salt bath, said volatile metal chloride, and particularized portions of the metallic component of said chloride; heater means for forming and maintaining said solid materials in a molten state in each said respective melter and vaporizer vessels; means for agitating said molten materials in each of the chambers of said melter vessel and in said vaporizer vessel; and separate conduit means for discharging vaporized materials from the respective upper portions of said melter and vaporizer vessels.

References Cited in the file of this patent
UNITED STATES PATENTS

| | | |
|---|---|---|
| 2,035,453 | Betterton et al. | Mar. 31, 1936 |
| 2,608,472 | Flosdorf et al. | Aug. 26, 1952 |
| 2,743,169 | Hecker | Apr. 24, 1956 |
| 2,768,987 | Hart | Oct. 30, 1956 |
| 2,858,198 | McGeer et al. | Oct. 28, 1958 |
| 2,927,845 | Plunkett | Mar. 8, 1960 |